United States Patent [19]

Rich et al.

[11] Patent Number: 4,885,010

[45] Date of Patent: Dec. 5, 1989

[54] SPRAY BOOTH

[75] Inventors: Douglas A. Rich, Detroit; Paul N. Rick, Plymouth; James N. Bournias, Grosse Pointe Shores; Robert E. Lyons, Northville, all of Mich.

[73] Assignee: Gallagher-Kaiser Corporation, Detroit, Mich.

[21] Appl. No.: 252,893

[22] Filed: Oct. 3, 1988

[51] Int. Cl.$^4$ .............................................. B01D 47/00
[52] U.S. Cl. .................................. 55/241; 261/119.1; 98/115.2
[58] Field of Search ...................... 55/240, 241, 257.5, 55/445, 446; 261/119.1; 98/115.2

[56] References Cited

U.S. PATENT DOCUMENTS

| | | | |
|---|---|---|---|
| 3,884,654 | 5/1975 | de Crevoisier et al. | 55/225 |
| 4,012,469 | 3/1977 | Accortt | 261/117 |
| 4,023,942 | 5/1977 | Brady et al. | 55/241 |
| 4,210,428 | 7/1980 | Schneider et al. | 55/223 |
| 4,257,784 | 3/1981 | Gebhard et al. | 55/84 |
| 4,260,563 | 4/1981 | Brulhet | 261/23 R |
| 4,345,921 | 8/1982 | Gustausson et al. | 55/241 |
| 4,440,554 | 4/1984 | Perry | 55/241 |
| 4,515,073 | 5/1985 | Dorsch et al. | 98/115.2 |
| 4,521,227 | 6/1985 | Gerdes et al. | 55/241 |
| 4,612,025 | 9/1986 | Sampey | 55/257.5 |
| 4,704,952 | 11/1987 | Johnson et al. | 98/115.2 |
| 4,729,775 | 3/1988 | Patle et al. | 55/241 |
| 4,732,589 | 3/1988 | Parslow | 55/241 |

Primary Examiner—Bernard Nozick
Attorney, Agent, or Firm—Harness, Dickey & Pierce

[57] ABSTRACT

An improved scrubbing apparatus is disclosed which is particularly well suited for use in spray booths for extracting particulate matter entrained in a gas stream flowing therethrough. The scrubbing apparatus of the present invention combines an elongated throat and an elongated trough positioned therebelow which cooperate to define a first elongated constriction through which the gas stream is drawn. The trough also includes an angularly extended portion which defines a second constriction through which the gas stream is subsequently directed. Flood sheets are also provided across which a continous flow of liquid is passed which becomes atomized as it flows through the first and second constrictions so as to thereby effect a scrubbing of the gas stream and removal of the entrained particulate matter. The first constriction also serves to substantially reduce passage of air or gas thereacross when the apparatus is not in operation. Also, an improved air baffle arrangement is provided to effectively remove liquid from the gas stream before it is discharged.

12 Claims, 3 Drawing Sheets

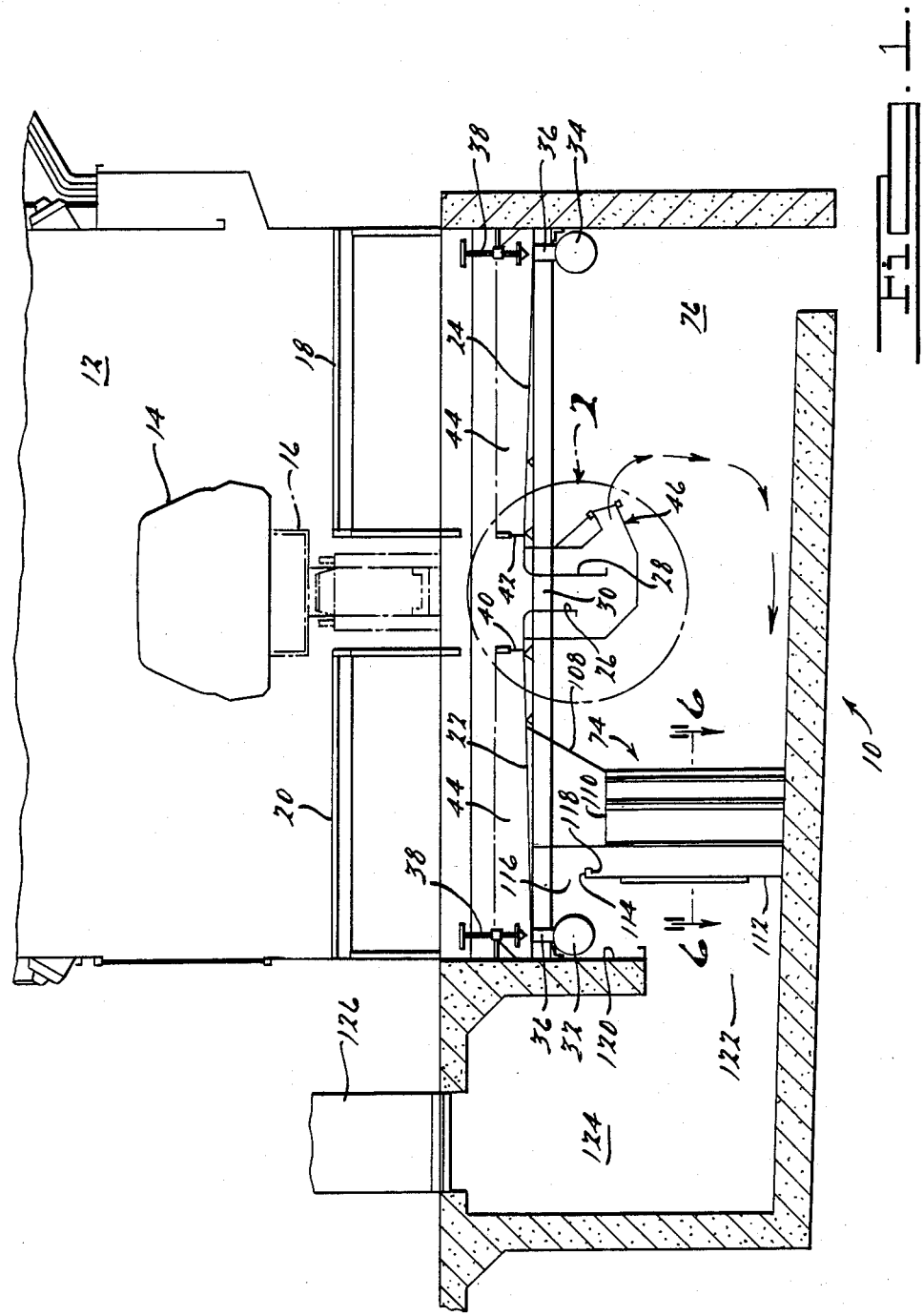

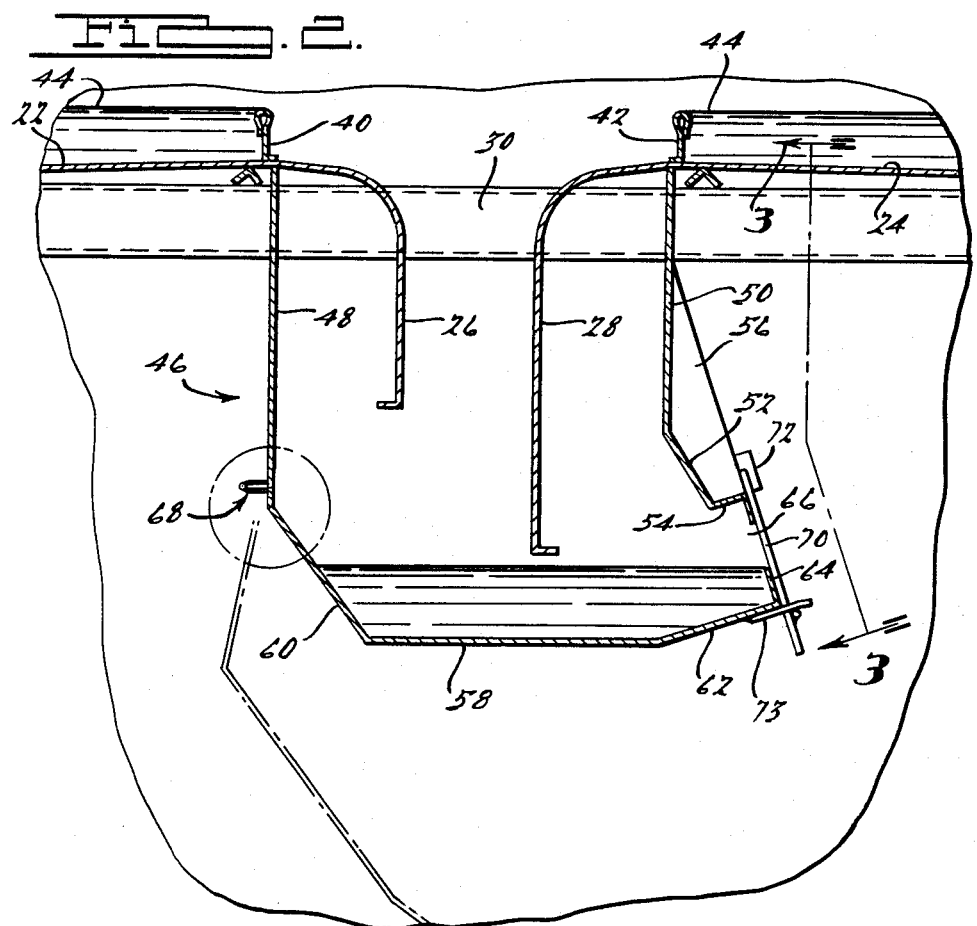
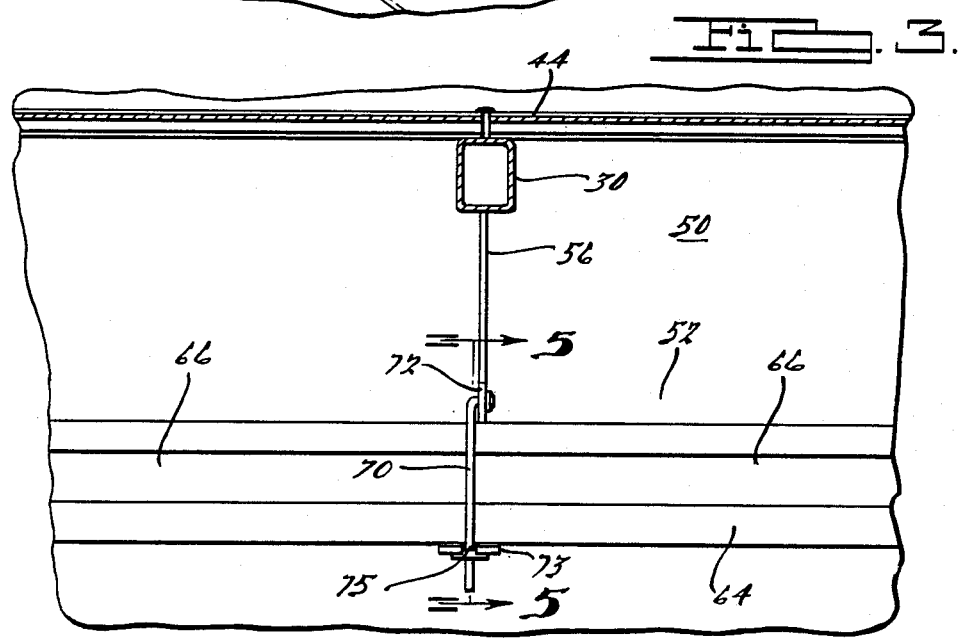

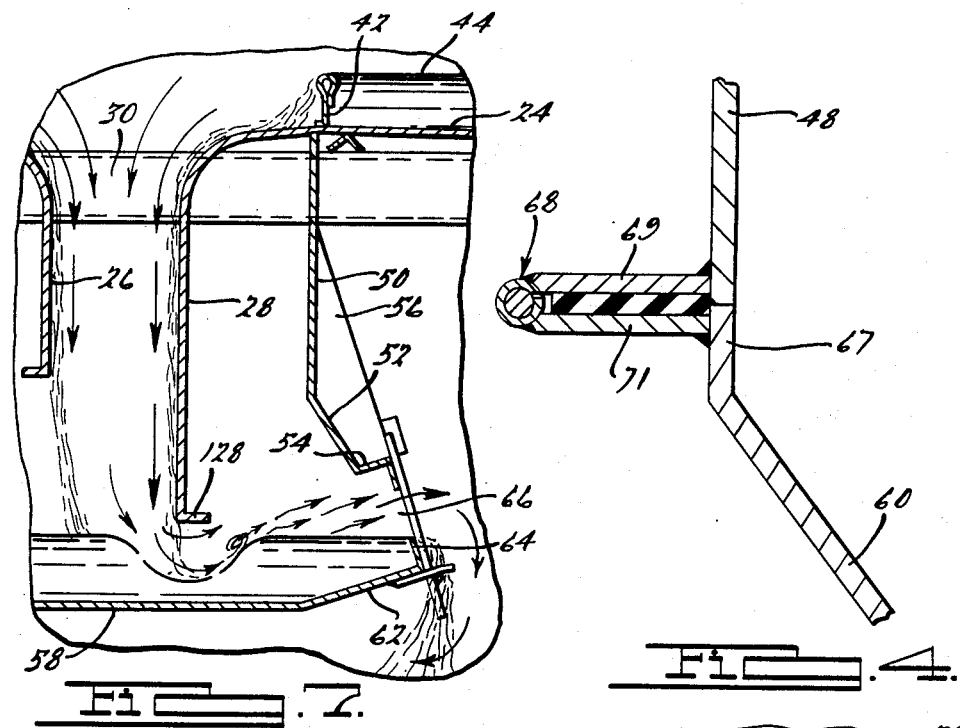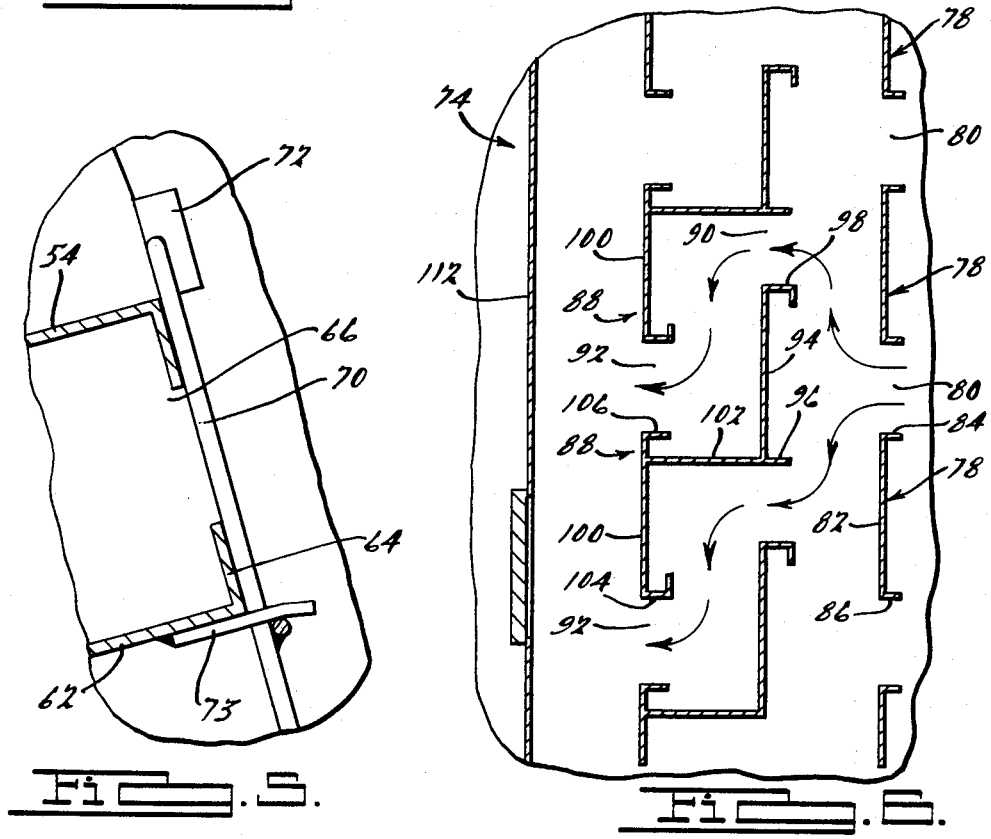

SPRAY BOOTH

BACKGROUND AND SUMMARY OF THE INVENTION

The present invention broadly relates to an improved scrubbing apparatus for extracting contaminating particulate matter entrained in a gas stream employing a liquid washing medium. The principles of the present invention are particularly applicable, but not necessarily restricted to the removal of entrained paint particles from the exhaust air stream from paint spray booths to provide an environmentally acceptable effluent while simultaneously recovering the paint overspray for processing in a paint reclamation system.

A variety of scrubbing devices have heretofore been used or proposed for use in association with paint spray chambers or booths. While such devices have provided satisfactory operation in the past, the imposition of more stringent environmental specifications on the maximum permissible levels of particulate matter in the exhaust effluent has necessitated further development of improved designs to increase the effectiveness of such devices in capturing and extracting large proportions of the entrained particulate matter.

In addition to increasingly stringent particulate matter removal, permissible noise levels for such apparatus are becoming more stringent which tends to conflict with the need to achieve better particulate removal. Another important factor to be considered in the design of such scrubbing apparatus is the need to effectively remove the liquid droplets from the gas stream prior to passage of the gas stream out through the exhaust stack or ductwork. Typically, the scrubbing liquid utilized is water which if allowed to remain in the air stream may result in accelerated corrosion of the exhaust stack.

Additionally because the exhaust stack or ductwork of such apparatus is vented outside of the building housing the scrubbing apparatus, it is important to incorporate in such apparatus means to prevent loss of warm plant air or infiltration of cold outside air during periods when the scrubber is not operating.

Accordingly, the present invention provides an improved scrubber apparatus particularly well suited for use in paint spray booth applications such as those commonly employed for the painting of motor vehicles which overcomes the problems associated with prior designs and achieves an extremely high degree of efficiency at very low noise levels. The scrubber apparatus of the present invention incorporates a pair of spaced constrictions through which the gas stream is serially drawn along with liquid overflow from the flood plates. The constrictions are designed such that the gas stream effects atomization of the liquid as they flow therethrough thus causing a mixing of the particulate matter entrained in the gas stream and the atomized liquid whereby the gas stream is cleansed of the entrained particulate matter. The first of these two constrictions is defined by a baffle member and liquid level contained within a trough which operates to substantially reduce exchange of interior and exterior air when the apparatus is not in use in addition to performing a first level of gas stream scrubbing. The second constriction serves to further scrub the gas stream flowing therethrough so as to assure a very high degree of particulate removal from the gas stream. Additionally, because this second constriction is being conducted by the first constriction, transmission of noise emanating from the second constriction into the spray chamber is substantially reduced. Thus, it is possible to so design the first and second constrictions that the major scrubbing action which typically results in the greatest noise generation is performed by the second constriction thereby maintaining a relatively low noise level within the spray chamber. Additionally, because scrubbing action is being accomplished at both constrictions, a very high level of efficiency in particulate removal from the gas stream is achieved.

The present invention also incorporates an improved arrangement for removal of the liquid from the gas stream prior to discharge to the exhaust stack. A series of baffle members are provided which create a labyrinth requiring the gas stream negotiate a series of 90° and 180° turns in a horizontal plane followed by a vertical baffle requiring the gas stream negotiate an initial turn of 90° followed by a 180° turn both in the vertical plane. This baffle arrangement effectively assures that all liquid droplets are removed from the air stream prior to its reaching the exhaust stack. Additionally, the positioning of the various baffle members has been designed so as to enable relatively easy access to the passages defined thereby so as to greatly facilitate cleaning of the apparatus with a minimum of time being required.

Accordingly, the present invention provides an improved scrubbing apparatus having the ability to achieve very high efficiency in removal of particulate matter at very low noise levels and to effectively remove liquid droplets from the gas stream so as to insure only a dry, clean, gas stream is discharged through the exhaust stack. Additionally, the design is executed so as to greatly facilitate periodic maintenance and cleaning thereof with a minimum amount of time and effort being required.

Additional advantages and features of the present invention will become apparent from the subsequent description and the appended claims taken in conjunction with the accompanying drawings.

BRIEF DESCRIPTION OF THE DRAWINGS

FIG. 1 is a transverse section view taken along a vertical plane illustrating the gas scrubbing apparatus of the present invention in combination with a paint spray booth;

FIG. 2 is an enlarged fragmentary view of that portion of the scrubbing apparatus enclosed within circle 2 of FIG. 1;

FIG. 3 is a fragmentary section view showing the outlet from the second constriction, the section being taken along lines 3—3 of FIG. 2;

FIG. 4 is an enlarged fragmentary view of the hinge arrangement for pivotably supporting the trough in accordance with the present invention;

FIG. 5 is a view showing the manner in which the trough is secured in an operative position;

FIG. 6 is a section view of the labyrinth section of the scrubber apparatus of FIG. 1, all in accordance with the present invention, the section being taken along line 6—6 thereof; and FIG. 7 is a view similar to that of FIG. 2, but showing the scrubbing apparatus of the present invention in operation.

DESCRIPTION OF THE PREFERRED EMBODIMENT

Referring now to the drawings and in particular to FIG. 1, there is shown a gas scrubbing apparatus in accordance with the present invention being indicated generally at 10. Gas scrubber 10 is shown embodied in a spray booth for painting of motor vehicles, however, it should be noted that the apparatus of the present invention may be utilized in other applications wherein it is desired to remove entrained particulate matter from a gas stream.

Gas scrubber 10 includes an elongated first chamber 12 defining a spray booth specifically adapted for painting of motor vehicles 14 moving therethrough via suitable conveyor apparatus 16. Metal grating panels 18, 20 are supported so as to define a floor adjacent either side of the moving vehicle 14 and associated conveyor apparatus 16 and provide a support upon which a spray gun operator may stand or alternatively robotic spray guns may be secured. The ceiling (not shown) of spray booth 12 will be designed to allow admission of suitably conditioned filtered air as is typical for such spray booths.

The lower portion of spray booth 12 is defined by a pair of spaced longitudinally extending flood plates 22, 24 which are sloped or inclined laterally outward. Each of the inner ends of flood plates 22 and 24 are smoothly radiused and include spaced longitudinally extending downwardly depending flange portions 26, 28 respectively defining a longitudinally extending throat 30 therebetween. A suitable liquid such as water is continuously supplied to each of the flood plates 22, 24 via longitudinally extending supply pipes 32, 34 and a plurality of longitudinally spaced risers 36 each of which is provided with suitable control valving 38 for regulating the flow. In order to avoid any unflooded areas on flood plates 22 and 24 due to unevenness of the surface or progressive accumulation of paint deposits, upstanding longitudinally extending flange members 40, 42 are provided on respective flood plates 22, 24 adjacent but spaced from throat 30. Flange members 40, 42 will serve as dams to maintain a liquid level as shown by reference number 44 over the entire surface of flood plates 22, 24 so as to thereby minimize the accumulation of paint deposits thereon.

A longitudinally extending trough assembly 46 is provided positioned below and underlying throat 30. As best seen with reference to FIG. 2, trough assembly 46 comprises a first longitudinally extending sidewall 48 secured to and depending from the undersurface of flood plate 22 in laterally outwardly spaced relationship to flange portion 26 and a longitudinally extending second sidewall 50 similarly secured to and depending from the undersurface of flood plate 24 in outwardly spaced relationship to flange portion 28. Sidewall 50 has a lower intermediate portion 52 extending angularly outwardly and a relatively narrow end flange section 54 extending generally perpendicularly from intermediate portion 52. A plurality of stiffening or reinforcing gussets 56 may be provided secured to the outer surface of sidewall 50 and spaced lontigudinally therealong as necessary.

A base wall 58 is also provided having a center portion from which outer portions 60 and 62 extend angularly upwardly. An end flange portion 64 of base wall 58 extends generally perpendicularly upwardly from outer portion 62 toward flange portion 54 and cooperates therewith to define a longitudinally extending constricted opening 66. The outer end of portion 60 includes a relatively short flange portion 67 projecting angularly therefrom in generally coplanar relationship to sidewall 48 and is pivotably secured thereto by hinge means 68 so as to enable the entire base wall to be pivoted downwardly as shown in phantom such as for cleaning. Preferably, as shown in FIG. 4, hinge means 68 will have the outer edges of pivotably interconnected legs 69 and 71 secured to sidewall 48 and flange portion 67 respectively such as by welding. The point of attachment of leg portions 69 and 71 to sidewall 48 and flange portion 67 will be positioned such that the edge portions of sidewall 48 and flange portion 67 will move into abutting sealing relationship when trough assembly 46 is moved into the operative position shown in full lines in FIG. 2 so as to prevent gas and/or liquid flow across this hinge joint. In order to retain base wall 58 in this generally horizontal operative position, a plurality of elongated rods 70 are provided being pivotably secured to outwardly extending projections 72 provided on gusset plates 56. A plate member 73 is secured to the undersurface of outer portion 62 of base wall 58 projecting outwardly therefrom and includes an outwardly opening slot 75 sized to receive an end portion of rod 70. A suitable stop member 77 such as for example a relatively short length of rod is secured adjacent the lower end of rod 70 and cooperates with the undersurface of plate 73 to retain base wall 58 in the operative position shown. Preferably, as shown in FIG. 5, the outer end portion of plate 73 will be bent downwardly a few degrees so as to aid in retaining rod 70 and associated stop member 77 in a latching position.

As shown in FIGS. 1 and 6, gas scrubber apparatus 10 also includes a liquid removal portion 74 disposed within a second chamber 76. Liquid removal portion 74 comprises a first series of upstanding substantially identical baffle members 78 arranged in side by side spaced aligned relationship and defining gas flowpath openings 80 therebetween. Each of these baffles comprise a generally planar vertically extending center portion 82 with relatively small flange portions 84, 86 extending outwardly at substantially right angles toward the gas stream flow at opposite ends thereof. A second series of substantially identical upstanding baffles 88 are also positioned in side by side spaced aligned relationship so as to define first and second longitudinally shifted gas flowpath openings 90, 92 therebetween. Baffles 88 are each generally "Z" shaped and include a first planar portion 94 positioned so as to overlie openings 80 but spaced in the direction of flow of the gas stream therefrom. Flange portions 96, 98 projecting into the gas flowpath are provided at opposite ends of planar portion 92. A second planar portion 100 is spaced downstream from and longitudinally shifted from planar portion 94 so as to overlie respective flowpath openings 90. An interconnecting planar portion 102 interconnects one end of planar portion 94 with planar portion 100. Also, planar portion 100 has flange portions 104, 106 projecting upstream of the gas flowpath from opposite ends thereof.

As shown in FIG. 1, each of these baffle members extend from the floor of chamber 76 generally vertically upwardly a substantial distance. Suitable plate members 108, 110 are secured between the top edge of baffle members 78 and 88 and the undersurface of flood plate 22 so as to insure the entire gas stream will be directed through the tortuous path defined by the upstanding baffles. Another longitudinally extending baffle member 112 is also provided extending generally vertically upwardly from the floor of chamber 76 spaced downstream from baffle member 88. Baffle member 112 has an upper edge 114 positioned above the tops of baffle members 78, 88 but spaced from the undersurface of flood plate 22 so as to define a gas stream flowpath opening 116 therebetween. Also, a generally U-shaped channel flange portion 118 is provided extending along top edge 114. A depending longitudinally extending baffle member 120 is also provided extending downwardly from the outer edge of flood plate 22 to a level well below the upper edge 114 of baffle 112 but spaced from the floor of chamber 76 so as to define a final gas flowpath opening 122 discharging into a longitudinally extending manifolding chamber 124 from which the gas stream is discharged via exhaust duct 126.

In operation, a gas stream will be drawn or blown into spray booth chamber 12 through the ceiling thereof or through other suitably positioned inlet vents (not shown) and will be directed downwardly over the work area and through open metal grating 18 and 20 thereby sweeping any particulate matter such as paint solids not adhering to the vehicle therewith. It should be noted that the air entering chamber 12 will have been suitably conditioned and/or filtered so as to establish desired moisture content and/or cleanliness required for the particular operation being carried on within chamber 12.

In any event, the particulate laden air is caused to flow downwardly through throat 30 along with a continuous stream of liquid such as water overflowing dams 40 and 42.

As shown in FIG. 7, the water and gas stream will intermix as they travel downwardly through throat 30. This intermixing will be further increased and a portion of the water atomized as the gas stream is caused to flow through the first constriction defined by the lower edge 128 of flange portion 28 and the liquid retained within trough 46. In fact as shown, a localized depression and rolling standing wave will occur in the surface of the liquid due to the pressure exerted thereon by the gas flow which action will further increase the scrubbing action on the gas stream.

The gas stream and atomized water droplets will then flow through a second longitudinally extending constriction defined by opening 66. Additionally, as water will be continuously flowing into trough 46, it will also be flowing over the edge of flange 64 of opening 66 along with the gas stream thus resulting in further atomization and hence enhanced scrubbing action. It should also be noted that opening 66 faces in an opposite direction to that which the gas stream must travel before exiting chamber 76. As the water is continuously overflowing the upper edge of flange 64, a water screen will be formed through which the gas stream must travel which will further enhance the cleansing thereof.

The relatively high velocity of the gas stream as it travels through the first and second constrictions described above will result in atomization of the water and substantial mixing between the water and gas stream with the result that numerous various size water droplets will be entrained within and carried by the rapidly moving gas stream. This intermixing action is primarily responsible for achieving the removal of particulate matter entrained within the gas stream. However, as the gas stream enters chambers 76, the velocity thereof will drop dramatically thus causing the larger heavy water droplets and larger now wetted particulate matter to drop out of the gas stream. Many of the smaller water droplets will remain in the flowing gas stream and, if allowed to pass through the exhaust duct, may result in excess corrosion of the exhaust ducting and/or buildup of particulate matter entrained within the droplets in the exhaust ductwork.

In order to remove these smaller water droplets, the gas stream is caused to flow through a rather tortuous path defined by the baffle arrangement of liquid removal portion 74 of the gas scrubber 10. As shown in FIG. 6, the gas stream is caused to negotiate a series of right and left substantially 90° turns in a horizontal plane followed by 90° and 180° turns in the vertical plane by baffles 78, 88, 112, and 120 before reaching the exhaust duct. The inability of these entrained water droplets to negotiate the repetitive turns due to their greater mass will result in them being deposited on the planar surfaces of the respective baffles. It should be noted that the flange portions provided at the opposite ends of these planar surfaces serve to both stiffen the baffle members as well as to restrict the flow of the thus deposited droplets outwardly to a location where they may be picked up by the flowing gas stream. Thus, the gas stream entering the exhaust stack will be substantially free of any water droplets and will also have a very low particulate content. Water droplets removed from the gas stream along with the particulate matter entrained therein will flow across the sloped floor of chamber 76 to a catch basin from which it will flow to suitable collection tanks for further processing.

It should be noted that because the water droplets removed from the gas stream by the moisture removal portion 74 of scrubber 10 contain particulate matter which may adhere to the surfaces of the baffles, it is necessary to gain access to this labyrinth for cleaning purposes. To this end, an access door is provided in baffle 112 and the baffles 78, 88 and 112 are spaced sufficiently to enable an individual to move therethrough. This spacing arrangement greatly facilitates the cleaning thereof.

The scrubber 10 of the present invention is also very effective in reducing exchange of plant and outside air during periods of non-use. As shown in FIG. 2, the lower edge of flange member 28 is positioned in close proximity to the static surface of the liquid retained within trough 46. Thus, only a very small opening remains for exchange of air to occur. This arrangement eliminates the need to incorporate costly complex damper arrangements to minimize such air exchange and hence also avoids the cost and time required for periodic maintenance of such damper arrangements. While as shown there is a slight spacing between the static surface of the water level within trough 46 and lower edge of flange 28 in some applications, it may be desirable to extend this lower flange below the water level surface so as to thereby effect a complete seal against air exchange. It should also be noted that it is believed the presence of the water defining one side of this restricted opening aids in dampening noise vibrations emanating from the second restriction as well as reducing the noise generation from this restriction.

Accordingly, as may now be appreciated, the gas scrubber apparatus of the present invention provides greatly improved operating efficiencies in terms of both particulate removal from the gas stream as well as liquid removal therefrom. Further, the design thereof is such as to greatly reduce the downtime required for periodic maintenance thereof by offering ease of accessibility to those areas requiring such periodic cleaning. Additionally, the trough and depending flange arrangement provides the damper action necessary to effectively restrict exchange of interior and exterior air without any added cost nor increased maintenance requirements. The dual constriction arrangement incorporated in the scrubber of the present invention also serves to greatly reduce the noise level within the spray booth.

While it will be apparent that the preferred embodiments of the invention diclosed are well calculated to provide the advantages and features above stated, it will be appreciated that the invention is susceptible to modification, variation and change without departing from the proper scope or fair meaning of the subjoined claims.

We claim:

1. A gas scrubber comprising:
   an enclosure including gas inlet means and outlet means;
   means defining a first chamber within said enclosure, said first chamber having liquid inlet means;
   means defining a second chamber within said enclosure and disposed adjacent said first chamber, said second chamber including liquid outlet means;
   a throat defining an opening between said first chamber and said second chamber for allowing a gas containing entrained particulate matter and a liquid to flow from said first chamber to said second chamber;
   trough means disposed in intercepting relationship with respect to the flow of said gas and said liquid through said throat, said trough means being operative to retain a reservoir of said liquid, the surface of said liquid within said reservoir cooperating with a wall portion extending from said throat to define a first constriction and said trough further including means cooperating with wall means for defining a second constriction spaced from said first constriction; and
   means for causing a pressure differential between said first and second chambers whereby said gas and said liquid are caused to flow from said first chamber into said second chamber, said first and second constrictions being operative to effect atomization of said liquid and mixing of said liquid and said gas for scrubbing particulate matter from said gas.

2. A scrubber as set forth in claim 1 wherein said throat is defined by a pair of spaced flange members, one of said flange members cooperating with said liquid surface to define said first constriction.

3. A scrubber as set forth in claim 1 wherein said trough means is pivotably supported in intercepting relationship with respect to said flow of said gas and said liquid so as to facilitate access to said throat.

4. A scrubber as set forth in claim 1 wherein said second constriction is downstream from said first constriction.

5. A scrubber as set forth in claim 5 wherein said second constriction is defined by a pair of spaced substantially coplanar flange members.

6. A scrubber as set forth in claim 6 wherein said throat is defined by a pair of spaced flange members, one of said flange members cooperating with said liquid surface to define said first constriction.

7. A scrubber as set forth in claim 1 further including a labyrinth baffle arrangement in said second chamber for passage of the gas therethrough, said labyrinth baffle arrangement being operative to effect extraction of liquid particles from said gas stream.

8. A scrubber as set forth in claim 10 wherein said labyrinth baffle arrangement comprises a plurality of planar surfaces positioned in spaced relationship to each other and in substantially perpendicular relationship to the general direction of gas flow whereby said gas stream is caused to negotiate a plurality of successive turns.

9. A scrubber as set forth in claim 11 wherein said planar surfaces are arranged to define a first series of vertically extending openings through which said gas stream is directed to negotiate a plurality of turns generally in a horizontal plane and a second series of horizontally extending openings through which said gas stream is directed to negotiate a plurality of turns generally in a vertical plane.

10. A scrubber as set forth in claim 12 wherein each of said planar surfaces has a flange member at the outer free end thereof projecting outwardly therefrom in a direction opposite the direction of gas flow, said flanges being operative to restrict flow of liquid impinging on said planar surfaces into said gas stream.

11. A gas scrubbing device comprising an enclosure including means defining a first longitudinally extending chamber having inlet means for receiving a stream of gas, a second longitudinally extending chamber disposed beneath said first chamber and separated therefrom by means of an angularly inclined flood sheet terminating in a downwardly oriented longitudinally extending throat, said first chamber including fluid inlet means operative to flow fluid over said flood sheet, said stream of gas flowing through said throat and containing entrained particulate matter, a longitudinally extending trough comprising a pair of sidewalls and a base wall disposed beneath said throat and in intercepting relationship with the gas and liquid passing therethrough, said trough being adapted to retain a reservoir of said liquid, said throat formed with a longitudinally extending baffle having its lower edge disposed in upward spaced relationship from said base of said trough and defining between said lower edge and the surface of said liquid retained in said trough a first constriction, said base formed with an angular upwardly extending section laterally spaced from said first constriction and spaced from the lower edge of one of said pair of sidewalls and defining therebetween a second constriction in the form of a longitudinally extending slot for lateral discharge of the gas and liquid from said trough into said second chamber, means for providing a differential pressure between said first and said second chambers to induce flow of gas from said first chamber through said throat and trough into said second chamber, and means for supplying a continuous sheet of liquid over said flood sheet for flow into said throat and said trough, said liquid being atomized by the gas at said first constriction and said second constriction for scrubbing particulate matter from the gas.

12. The device as set forth in claim 14 further including a labyrinth baffle arrangement in said second chamber for passage of the gas therethrough to effect extraction of liquid particles from the gas prior to discharge of said gas to the atmosphere.

* * * * *

UNITED STATES PATENT AND TRADEMARK OFFICE
CERTIFICATE OF CORRECTION

PATENT NO. : 4,885,010

DATED : December 5, 1989

INVENTOR(S) : Douglas A. Rich et al

It is certified that error appears in the above-identified patent and that said Letters Patent is hereby corrected as shown below:

ON THE TITLE PAGE, under "U.S. Patent Documents" reference 4,729,775
"Patle et al" should be --Patte et al--.

Column 1, line 67, after "is" insert --spaced from the chamber within which the spraying operation is--.

Column 3, line 61, "lontigudinally" should be --longitudinally--.

Column 7, line 10, "diclosed" should be --disclosed--.

Column 7, line 58, Claim 5, "5" (second occurrence) should be --4--.

Column 7, line 61, Claim 6, "6" (second occurrence) should be --5--.

UNITED STATES PATENT AND TRADEMARK OFFICE
CERTIFICATE OF CORRECTION

PATENT NO. : 4,885,010

DATED : December 5, 1989

INVENTOR(S) : Douglas A. Rich et al

It is certified that error appears in the above-identified patent and that said Letters Patent is hereby corrected as shown below:

Column 8, line 4, Claim 8, "10" should be --7--.

Column 8, line 11, Claim 9, "11" should be --8--.

Column 8, line 19, Claim 10, "12" should be --9--.

Column 8, line 61, Claim 12, "14" should be --11--.

Signed and Sealed this

Thirteenth Day of November, 1990

*Attest:*

HARRY F. MANBECK, JR.

*Attesting Officer*    *Commissioner of Patents and Trademarks*